(12) United States Patent  (10) Patent No.: US 7,381,666 B2
Little et al.  (45) Date of Patent: Jun. 3, 2008

(54) BREATHABLE FILM AND FABRIC HAVING LIQUID AND VIRAL BARRIER

(75) Inventors: Sylvia B. Little, Marietta, GA (US); Roger Bradshaw Quincy, III, Cumming, GA (US); John A. Rotella, Alpharetta, GA (US); Phillip A. Schorr, Atlanta, GA (US); Steven R. Stopper, Duluth, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 847 days.

(21) Appl. No.: 10/325,441

(22) Filed: Dec. 20, 2002

(65) Prior Publication Data

US 2008/0108268 A1  May 8, 2008

(51) Int. Cl.
*B32B 27/12* (2006.01)
*B32B 27/36* (2006.01)
*D04H 1/56* (2006.01)
*D04H 3/16* (2006.01)

(52) U.S. Cl. .................. 442/394; 442/395; 442/400; 442/401; 442/409; 442/417; 442/381; 442/382; 428/304.4; 428/306.6; 428/323; 428/327

(58) Field of Classification Search ............ 428/304.4, 428/306.6, 315.5, 323, 327; 442/394, 395, 442/400, 401, 409, 417, 381, 382
See application file for complete search history.

(56) References Cited

U.S. PATENT DOCUMENTS

| 3,125,547 A | 3/1964 | Blatz |
| 3,338,992 A | 8/1967 | Kinney |
| 3,341,394 A | 9/1967 | Kinney |
| 3,502,538 A | 3/1970 | Petersen |
| 3,502,763 A | 3/1970 | Hartmann |
| 3,542,615 A | 11/1970 | Dobo et al. |
| 3,692,618 A | 9/1972 | Dorschner et al. |
| 3,802,817 A | 4/1974 | Matsuki et al. |
| 3,849,241 A | 11/1974 | Buntin et al. |
| 4,340,563 A | 7/1982 | Appel et al. |
| 5,145,727 A | 9/1992 | Potts et al. |
| 5,190,806 A | 3/1993 | Nomi .................. 428/198 |
| 5,198,162 A | 3/1993 | Park et al. .............. 264/49 |
| 5,234,739 A | 8/1993 | Tanaru et al. .......... 428/131 |
| 5,260,360 A | 11/1993 | Mrozinski et al. ........ 524/95 |
| 5,272,236 A | 12/1993 | Lai et al. |
| 5,300,365 A | 4/1994 | Ogale |

(Continued)

FOREIGN PATENT DOCUMENTS

EP  0 574 160 A1  12/1993

(Continued)

*Primary Examiner*—Norca Torres-Velazquez
(74) *Attorney, Agent, or Firm*—Dority & Manning, P.A.

(57) ABSTRACT

A breathable viral barrier film, viral barrier laminate and surgical articles including the film or laminate are provided. The film has viral barrier properties in the presence of low surface tension liquids, as well as in the presence of aqueous liquids. The film includes a core layer surrounded by two skin layers. The core layer includes a polymer matrix, filler particles, and at least 0.5% by weight of a selected fluorochemical. The film is bonded to one or more nonwoven webs to provide laminates useful in surgical articles.

49 Claims, 3 Drawing Sheets

U.S. PATENT DOCUMENTS

| | | | |
|---|---|---|---|
| 5,322,728 A | 6/1994 | Davey et al. | |
| 5,352,513 A | 10/1994 | Mrozinski et al. | 428/315.5 |
| 5,374,453 A | 12/1994 | Swei et al. | 427/226 |
| 5,417,678 A | 5/1995 | Baumann et al. | 604/333 |
| 5,459,188 A | 10/1995 | Sargent et al. | |
| 5,473,118 A | 12/1995 | Fukutake et al. | 174/258 |
| 5,560,974 A | 10/1996 | Langley | |
| 5,560,992 A * | 10/1996 | Sargent et al. | 428/373 |
| 5,571,619 A | 11/1996 | McAlpin et al. | |
| 5,682,618 A | 11/1997 | Johnson et al. | 2/275 |
| 5,690,949 A * | 11/1997 | Weimer et al. | 424/402 |
| 5,738,111 A | 4/1998 | Weimer et al. | 128/849 |
| 5,753,358 A | 5/1998 | Korleski | 428/308.4 |
| 5,786,058 A | 7/1998 | Megchelsen et al. | 428/57 |
| 5,830,603 A | 11/1998 | Oka et al. | 429/249 |
| 5,865,919 A | 2/1999 | Megchelsen et al. | 156/73.4 |
| 5,869,172 A | 2/1999 | Caldwell | 428/306.6 |
| 5,876,792 A * | 3/1999 | Caldwell | 427/171 |
| 5,879,493 A | 3/1999 | Johnson et al. | 156/73.3 |
| 5,879,794 A | 3/1999 | Korleski, Jr. | 428/317.1 |
| 5,935,370 A | 8/1999 | Weimer et al. | 156/290 |
| 5,981,038 A | 11/1999 | Weimer et al. | 428/198 |
| 5,981,614 A | 11/1999 | Adiletta | 521/145 |
| 5,989,698 A | 11/1999 | Mrozinski et al. | 428/315.7 |
| 6,037,281 A | 3/2000 | Mathis et al. | |
| 6,040,251 A | 3/2000 | Caldwell | 442/123 |
| 6,072,005 A * | 6/2000 | Kobylivker et al. | 525/240 |
| 6,096,428 A | 8/2000 | Jing et al. | 428/421 |
| 6,127,486 A | 10/2000 | Bürger et al. | 525/199 |
| 6,156,400 A | 12/2000 | Jing et al. | 428/35.7 |
| 6,183,853 B1 | 2/2001 | Exsted | 428/308.4 |
| 6,197,393 B1 | 3/2001 | Jing et al. | 428/35.9 |
| 6,203,889 B1 | 3/2001 | Quincy, III et al. | |
| 6,265,045 B1 | 7/2001 | Mushaben | 728/77 |
| 6,475,591 B2 | 11/2002 | Mushaben | 428/77 |
| 6,479,154 B1 * | 11/2002 | Walton et al. | 428/424.4 |

FOREIGN PATENT DOCUMENTS

| | | |
|---|---|---|
| EP | 0 757 139 A1 | 2/1997 |
| EP | 0 760 834 B1 | 10/1998 |
| EP | 0 985 740 A1 | 3/2000 |
| EP | 0 820 382 B1 | 10/2000 |
| WO | 96/25240 | 8/1996 |
| WO | WO 98/20713 | 5/1998 |
| WO | WO 98/38029 | 9/1998 |
| WO | WO 99/00455 | 1/1999 |
| WO | WO 00/14296 | 3/2000 |
| WO | WO 00/14297 | 3/2000 |
| WO | WO 00/49669 | 8/2000 |
| WO | WO 00/69950 | 11/2000 |
| WO | WO 02/062585 | 8/2002 |

* cited by examiner

BREATHABLE FILM AND FABRIC HAVING LIQUID AND VIRAL BARRIER

FIELD OF THE INVENTION

The present invention is directed to a film and a film/nonwoven laminate fabric, having breathability to water vapor and barrier to the passage of liquid and viruses.

BACKGROUND OF THE INVENTION

Surgical gowns, surgical drapes, surgical face masks, surgical scrubs, and sterile wrap and sterilization peel pouches (hereinafter collectively "surgical articles"), in order to function satisfactorily, must achieve a balance of properties, features and performance characteristics. Such surgical articles have, as a principal matter, been designed to greatly reduce, if not prevent, the transmission through the surgical article of biological liquids and/or airborne contaminates. In surgical procedure environments, such liquid sources include the gown wearer's perspiration, body fluids from the patient, such as blood, and life support liquids such as plasma and saline. Examples of airborne contaminates include, without limitation, biological contaminants, such as bacteria, viruses and fungal spores. Such contaminates may also include particulate material such as, without limitation, lint, mineral fines, dust, skin squames and respiratory droplets. A measure of the barrier fabric's ability to prevent the passage of such airborne materials is sometimes expressed in term of filtration efficiency.

Such surgical articles further should be comfortable during use, that is, while being worn. The breathability of the surgical article, that is, its rate of water vapor transmission, is an important measure of how comfortable a surgical article is to use. Other characteristics of surgical articles that impact upon the comfort of the article during use include, without limitation, the drapeability, cloth-like feel and hand and cool, dry feel of the articles.

Surgical articles also require a minimum level of strength and durability in order to provide the necessary level of safety to the user of the article, particularly during surgical procedures.

Finally, surgical articles desirably are inexpensive to manufacture, utilizing lightweight materials that enhance the comfort of the wearer during use, but also reduce the cost of such articles.

The use of liquid impervious, breathable multi-layer barrier fabrics of various constructions is known. Surgical articles formed from liquid repellent fabrics, such as fabrics formed from nonwoven webs or layers, have provided acceptable levels of liquid imperviousness, breathability, cloth-like drapeability, strength and durability, and cost. However, the need exists nonetheless for improved, cloth-like, liquid impervious, breathable barrier materials for use in forming surgical articles, as well as other garment and over-garment applications, such as personal protective equipment applications (i.e., workwear, for example), in which some or all of the above performance characteristics and features are desirable or necessary. Other personal protective equipment applications include, without limitation, laboratory applications, clean room applications, such as semiconductor manufacturing, agriculture applications, mining applications, environmental applications, and the like.

Various low surface tension liquids are used in hospitals and other sites where surgical and medical procedures are performed. Low surface tension liquids, such as isopropyl alcohol, can combine with blood and other fluids to create wettable pathways capable of carrying viruses through various surgical articles mentioned above. For instance, surgical articles formed using microporous thermoplastic polyolefin-based films and film/nonwoven laminates are inherently hydrophobic, and resist the passage of blood and other aqueous fluids which might carry viruses. However, these films and laminates are typically less resistant to the passage of low surface tension liquids. Thus, when blood or other aqueous fluid is combined with isopropyl alcohol or another low surface tension liquid, a vehicle can be formed for carrying blood-borne viruses and the like through the surgical articles.

With the foregoing in mind, there is a need or desire for improved breathable thermoplastic films and film/nonwoven laminates that prevent the passage of low surface tension liquids, such as isopropyl alcohol, as well as aqueous-based liquids.

SUMMARY OF THE INVENTION

The present invention is directed to a breathable multi-layer thermoplastic polymer-based film and film/nonwoven laminate which prevents the passage of both aqueous-based and low surface-tension liquids, thereby providing improved liquid and viral barrier properties along with breathability to water vapor. The breathable film includes a core layer including a thermoplastic polymer, a particulate filler and at least 0.5% by weight of a fluorochemical. The film also includes two skin layers, one on each side of the core layer. The skin layers each include a thermoplastic polymer and zero to less than 0.5% by weight fluorochemical, and may include a particulate filler.

The skin layers are desirably used as thermal bonding layers to nonwoven web layers on one or both sides of the film. To this end, the skin layers desirably provide the film with oleophilic surfaces for improved thermal bonding. The oleophilic surfaces may permit the passage of oil, such as mineral oil, but do not permit the passage of aqueous liquids through the film. The fluorochemical present in at least the core layer prevents the passage of low surface tension liquids.

The skin layers in the film help contain, but may not prevent migration of the fluorochemical from the core layer. Fluorochemicals which are made using electrochemical fluorination processes may contain sulfonamide groups. There has been some controversy relative to this chemistry. A less controversial fluorochemical may be prepared using a different process, such as a telomerization process, and does not contain any sulfonamide groups.

With the foregoing in mind, it is a feature and advantage of the invention to provide a breathable thermoplastic barrier film which prevents passage of aqueous and/or low surface tension liquids, resulting in improved viral barrier.

It is also a feature and advantage of the invention to provide a breathable film/nonwoven laminate fabric which prevents passage of aqueous and/or low surface tension liquids through the film, resulting in improved viral barrier.

It is also a feature and advantage of the invention to provide various surgical articles which embody the breathable thermoplastic polymer-based film and/or the film/nonwoven laminate.

DEFINITIONS

Figure 1:
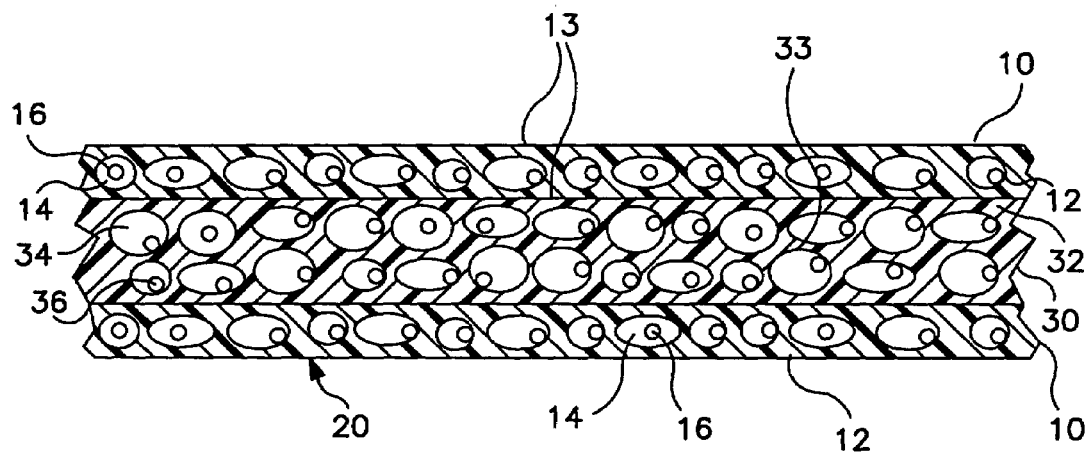
FIG. 1 is a cross-sectional view of a breathable thermoplastic viral barrier film according to the invention.

The terms "breathable film" or "breathable laminate" refer to a film or laminate having a water vapor transmission rate ("WVTR") of at least about 500 grams/m²-24 hours, suitably at least about 1000 grams/m²-24 hours, desirably at least about 2000 grams/m²-24 hours, using the WVTR Test Procedure described herein. Breathable materials typically rely on molecular diffusion of vapor, or vapor passage through micropores, and are substantially liquid impermeable.

The terms "viral barrier film" or "viral barrier laminate" refer to a film or film/nonwoven laminate which passes the federal performance standard for bacteriophage, set forth in ASTM F1671.

The terms "liquid barrier film" or "liquid barrier laminate" refer to a film or film/nonwoven laminate which passes the federal performance standard for synthetic blood strikethrough, set forth in ASTM F1670.

The term "low surface tension liquid" refers to a liquid having a surface tension of 40 dyne/cm or less, measured using ASTM D 1331-89. A breathable film or film/nonwoven laminate provides barrier to low surface tension liquid if the film resists penetration to a low surface tension liquid below 40 dyne/cm, alternatively below 30 dyne/cm, alternatively at about 26 dyne/cm, alternatively between 22 and 40 dyne/cm, alternatively between 26 and 40 dyne/cm under pressure of 300 millibars for a time of at least 50 minutes, alternatively under pressure of 300 millibars for a time of at least 30 minutes, alternatively under a pressure of 150 millibars for a time of at least 50 minutes, alternatively under a pressure of 150 millibars for a time of at least 30 minutes, alternatively under a pressure of 19 millibars for a time of at least 50 minutes, alternatively under a pressure of 19 millibars for a time of at least 30 minutes, using the modified hydrohead test described herein. The term "hydrohead" refers to hydrostatic head and the terms should be considered synonymous for this application.

The term "nonwoven fabric or web" means a web having a structure of individual fibers or threads which are interlaid, but not in a regular or identifiable manner as in a knitted fabric. Nonwoven fabrics or webs have been formed from many processes such as, for example, meltblowing processes, spunbonding processes, air laying processes, conforming processes, and bonded carded web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91.)

The term "spunbonded fibers" refers to small diameter fibers which are formed by extruding molten thermoplastic material as filaments from a plurality of fine capillaries of a spinnerette having a circular or other configuration, with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartmann, U.S. Pat. No. 3,502,538 to Petersen, and U.S. Pat. No. 3,542,615 to Dobo et al., each of which is incorporated herein in its entirety by reference. Spunbond fibers are quenched and generally not tacky when they are deposited onto a collecting surface. Spunbond fibers are generally continuous and often have average deniers larger than about 0.3, more particularly, between about 0.6 and 10.

The term "meltblown fibers" means fibers formed by extruding a molten thermoplastic material through a plurality of fine, usually circular, die capillaries as molten threads or filaments into converging high velocity heated gas (e.g., air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed for example, in U.S. Pat. No. 3,849,241 to Butin et al. Meltblown fibers are microfibers which may be continuous or discontinuous, are generally smaller than about 1.0 denier, and are generally selfbonding when deposited onto a collecting surface.

The term "microfibers" means small diameter fibers typically having an average fiber denier of about 0.005-10. Fiber denier is defined as grams per 9000 meters of a fiber. For a fiber having circular cross-section, denier may be calculated as fiber diameter in microns squared, multiplied by the density in grams/cc, multiplied by 0.00707. For fibers made of the same polymer, a lower denier indicates a finer fiber and a higher denier indicates a thicker or heavier fiber. For example, the diameter of a polypropylene fiber given as 15 microns may be converted to denier by squaring, multiplying the result by 0.89 g/cc and multiplying by 0.00707. Thus, a 15 micron polypropylene fiber has a denier of about 1.42 calculated as ($15^2 \times 0.89 \times 0.00707 = 1.415$). Outside the United States the unit of measurement is more commonly the "tex" which is defined as the grams per kilometer of fiber. Tex may be calculated as denier/9.

The term "film" refers to a thermoplastic film made using a film extrusion process, such as cast, blown film or extrusion coating. This term includes films rendered microporous by mixing polymer with filler, forming a film from the mixture, and stretching the film to create the voids. Additionally, two or more incompatible polymers could be blended and also stretched to create a microporous film. Also included are films in which one or more polymers are extracted by a solvent or other means to create micropores. It also includes monolithic films which rely on the solubility of water molecules in the solid polymer film, the diffusion of water molecules through the solid polymer film and evaporation of the water passing through the film into the surrounding air. In addition, foams with ruptured "cells" from stretching or "open cells" also are included, provided there is a sufficiently tortuous path to prevent the passage of aqueous liquids.

The term "microporous" refers to films having voids separated by thin polymer membranes and films having micropores passing through the films. The voids or micropores can be formed when a mixture of polymer and filler is extruded into a film and the film is stretched, preferably uniaxially in the machine direction. Microporous films tend to have water vapor transmission due to molecular diffusion of water vapor through the membranes or micropores, but substantially block the passage of aqueous liquids.

The term "polymer" includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and atactic symmetries.

The term "thermoplastic" refers to a polymer which melts and flows when heated.

DETAILED DESCRIPTION OF THE PRESENTLY PREFERRED EMBODIMENTS

Referring to FIG. 1, a breathable multilayer barrier film 20 of the invention includes a center (core) layer 30 and two outer (skin) layers 10. The center layer 30 includes a thermoplastic polymer matrix 32, a plurality of voids 34 within the matrix, and a plurality of filler particles 36 within the voids. The outer film layers 10 each include a polymer matrix 12 which is typically different from the polymer matrix 30 of the core layer, and which can be used to thermally bond the film 20 to a nonwoven web without destroying the integrity of the core layer 30, as described further below. In the embodiment shown, each outer layer 10 includes a plurality of voids 14 within the matrix, and a plurality of filler particles 16 within the voids. In alternative embodiments, the outer layers 10 may be substantially free of voids and/or filler particles, especially where the skin layers 10 are very thin as described below.

The voids 34 within the core layer, and the voids 14 within the skin layers, are typically separated by thin polymer membranes within the respective polymer matrices 12 and 32. The membranes surrounding the voids, illustrated by numerals 13 and 33 in FIG. 1, readily permit molecular diffusion of water vapor from a first surface to a second surface of the breathable film 20. The rate of water vapor transfer through film 20 is at least about 500 grams/m$^2$-24 hours, suitably at least about 1000 grams/m$^2$-24 hours, desirably at least about 2000 grams/m$^2$-24 hours.

The matrix 32 of the core layer 30 can include any suitable film-forming matrix polymer. Examples of suitable matrix polymers include without limitation olefin polymers, for instance polyethylene, polypropylene, copolymers of mainly ethylene and $C_3$-$C_{12}$ alpha-olefins (commonly known as linear low density polyethylene), copolymers of mainly propylene with ethylene and/or $C_3$-$C_{12}$ alpha-olefins, and flexible polyolefins including propylene-based polymers having both atactic and isotactic propylene groups in the main polypropylene chain. Other suitable matrix polymers include without limitation elastomers, for example polyurethanes, copolyether esters, polyamide polyether block copolymers, ethylene methyl acrylate, ethylene ethyl acrylate, and ethylene vinyl acetate copolymers, and combinations of the foregoing. Single-site catalyzed polyolefins are useful, including those described in U.S. Pat. Nos. 5,571,619, 5,322,728, and 5,272,236, the disclosures of which are incorporated herein by reference.

Polymers made using single-site catalysts have a very narrow molecular weight range. Polydispersity numbers ($M_W/M_N$) of below 4 and even below 2 are possible for single-site catalyzed polymers. These polymers also have a controlled short chain branching distribution compared to otherwise similar Ziegler-Natta produced type polymers. It is also possible using a single-site catalyst system to control the isotacticity of the polymer quite closely.

Single-site catalyzed polymers are available from Exxon-Mobil Chemical Company of Baytown, Tex. under the trade name ACHIEVE® for polypropylene-based polymers and EXACT® and EXCEED® for polyethylene-based polymers. Dow Chemical Company of Midland, Mich. has polymers commercially available under the names ENGAGE® and AFFINTY®. These materials are believed to be produced using non-stereo selective single-site catalysts. Exxon-Mobil generally refers to their single-site catalyst technology as "metallocene" catalysts while Dow refers to theirs as "constrained geometry" catalysts to distinguish them from traditional Ziegler-Natta catalysts which have multiple reaction sites. Other manufacturers such as Atofina, BASF, Basell, BP-Amoco, and Hoechst are active in this area.

In one suitable embodiment, the polymer matrix 32 of the core layer 30 includes a mixture of a first ethylene-alpha olefin copolymer and a second ethylene-alpha olefin copolymer. The first ethylene-alpha olefin copolymer is a Ziegler-Natta catalyzed linear low density polyethylene (LLDPE). The LLDPE may have a melt index (190° C.) of about 2-10 grams/10 min., a density of about 0.910-0.925 grams/cm$^3$, and a comonomer content of about 5-25% by weight. The comonomer may be an alpha-olefin having 3-12 carbon atoms, desirably 6-8 carbon atoms. One suitable first ethylene-alpha olefin copolymer is DOWLEX® 2244A, available from the Dow Chemical Co.

The second ethylene-alpha olefin copolymer of the core layer 30 is a single-site catalyzed copolymer having a melt index (190° C.) of about 2-10 grams/10 min., a density of about 0.905-0.915 grams/cm$^3$, and a comonomer content of about 5-25% by weight. The comonomer may be an alpha-olefin having 3-12 carbon atoms, desirable 6-8 carbon atoms. One suitable second ethylene-alpha olefin copolymer is Exxon-Mobil 2MO65, available from the Exxon-Mobil Chemical Co.

The first and second ethylene alpha-olefin copolymers forming the matrix 32 may be present in a weight ratio of about 10-90 parts by weight first ethylene-alpha olefin copolymer to about 10-90 parts by weight second ethylene-alpha olefin copolymer, suitably about 50-80 parts by weight first ethylene-alpha olefin copolymer to about 20-50 parts by weight second ethylene-alpha olefin copolymer, desirably about 60-70 parts by weight first ethylene-alpha olefin copolymer to about 30-40 parts by weight second ethylene-alpha olefin copolymer.

In addition to the polymer matrix 32, the core layer 30 includes a particulate filler, suitably a particulate inorganic filler, shown as filler particles 36 in FIG. 1. Suitable inorganic fillers include without limitation calcium carbonate, clays, silica, alumina, barium sulfate, sodium carbonate, talc, magnesium sulfate, titanium dioxide, zeolites, aluminum sulfate, diatomaceous earth, magnesium sulfate, magnesium carbonate, barium carbonate, kaolin, mica, carbon, calcium oxide, magnesium oxide, aluminum hydroxide and combinations of these particles. The mean diameter for the inorganic filler particles 36 should range from about 0.1-10 microns, alternatively about 0.5-7.0 microns, alternatively about 0.8-2.0 microns.

The core layer 30 of breathable viral barrier film 20 should include about 25-80% by weight polymer matrix and about 20-75% by weight filler particles, suitably about 30-60% by weight polymer matrix and about 40-70% by weight filler particles, desirably about 40-50% by weight polymer matrix and about 50-60% by weight filler particles. The voids 34 surrounding the filler particles 36 typically each have a dimension in at least one direction which is larger than the corresponding dimension of the enclosed filler particle(s), caused by stretching of the film in at least one direction as described below.

The core layer 30 also includes at least 0.5% by weight of a fluorochemical. The maximum level is governed by the level of barrier properties desired. Suitably, the core layer includes 0.5-5.0% by weight of the fluorochemical, desirably about 1.0-4.0% by weight of the fluorochemical, particularly about 2.0-3.0% by weight of the fluorochemical. The amount and type of fluorochemical should be selected so as not to render the overall film 20 oleophobic, i.e., so that the film 20 is oleophilic. A film 20 is considered to be oleophilic if the film is wet by an oil such as mineral oil. One way to determine if a microporous film is oleophilic is to run the oil droplet test described below. If a film 20 is oleophilic, droplets of mineral oil applied to one film surface will initially wet the surface and subsequently enter the tortuous path created by the micropores in the film. The mineral oil will subsequently wet and travel through the micropores until some of the oil finally reaches the opposite surface of the film.

A film which is oleophobic, on the other hand, will not be wet by mineral oil applied during the oil droplet test. Oil droplets will typically remain on one surface of an oleophobic film, forming coherent beaded drops which do not enter the micropores and do not diffuse through the film. Whether or not a fluorochemical renders a film oleophobic is believed to be a function of the amount and type of the fluorochemical in the film, and the extent to which the fluorochemical migrates out of the layer in which it is placed and becomes concentrated at either film surface. For purposes of the present invention, the fluorochemical desirably has limited or no tendency to migrate out of the layer in which it is placed. If the fluorochemical does migrate, it should be of a type and in an amount so that the film remains oleophilic notwithstanding the migration of fluorochemical.

The fluorochemical used in the core layer 30 should also be devoid of sulfonamide linkages. A sulfonamide linkage is exemplified in a fluorochemical oxazolidinone represented by the following formula:

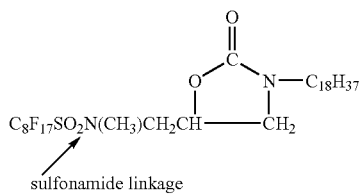

sulfonamide linkage

Fluorochemicals which are devoid of sulfonamide linkages can be prepared using a telomerization process. An exemplary telomerization process is represented by the following sequence of equations used to synthesize the fluorinated alkyl alcohols, as follows:

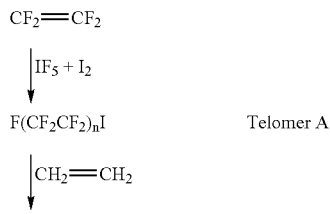

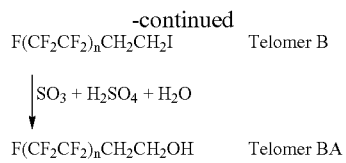

Reference: Organofluorine Chemistry: Principles And Commercial Applications, edited by R. B. Banks et al., Plenum Press, N.Y. 1994.

Fluorochemicals made by a telomerization process are herein referred to as telomerized fluorochemicals. Other fluorochemicals may also be used. An additive available from E.I. DuPont deNemours & Co. ("DuPont") is ZONYL™ FTS, a 2-perfluoroalkylethyl stearate. A fluorochemical from DuPont has been compounded at a 20% level into DOWLEX® 2244A (linear low density polyethylene) and is referred to as TLF-9536. Fluorosilicones and fluoroalloys are also useful in the invention. Specific useful fluorochemicals are described in U.S. Pat. Nos. 5,145,727, issued to Potts et al.; 5,459,188, issued to Sargent et al; and 6,203,889, issued to Quincy III et al.; the disclosures of which are incorporated by reference.

In addition to the core layer 30, the breathable viral barrier film 20 includes two outer skin layers. Each skin layer 10 includes a polymer matrix 12. The matrix 12 of the skin layers is preferably formed of a thermoplastic olefin polymer or polymer combination which facilitates thermal bonding of the breathable film 20 to one or more nonwoven webs using a thermal bonding process, such as a calendar bonding process, without compromising the breathability or viral barrier of the film 20. Suitable skin layer polymers include heterophasic propylene-ethylene copolymers, propylene-ethylene random copolymers, ethylene vinyl acetate, ethylene-methyl acrylate, amorphous (Ziegler-Natta or single-site catalyzed) ethylene-alpha olefin copolymers having densities of about 0.89 grams/cm$^3$ or less, amorphous poly-alpha olefin (APAO) polymers which can be random copolymers or terpolymers of ethylene, propylene and butene, other substantially amorphous or semi-crystalline propylene-ethylene polymers, and combinations of the foregoing.

In one suitable embodiment, the polymer matrix 12 of each skin layer 10 includes a mixture of a heterophasic propylene-ethylene polymer and an additional random propylene-ethylene copolymer. Heterophasic propylene-ethylene copolymers are available from Basell USA, Inc. ("Basell") under the trade name ADFLEX®. Heterophasic polymers are reactor combinations of different polymer compositions produced, in sequence, in the same reactor and combined together. Heterophasic propylene-ethylene polymers are described in U.S. Pat. No. 5,300,365 to Ogale (herein incorporated by reference), as having the following general composition:
  (a) from about 10 to 50 parts of a propylene homopolymer having an isotactic index greater than 80, or a copolymer of propylene with ethylene and/or an another alpha-olefin, containing over 80% propylene and having an isotactic index greater than 80;
  (b) from about 5 to 20 parts of a semi-crystalline copolymer fraction, which copolymer is insoluble in xylene at room or ambient temperature; and
  (c) from about 50 to 80 parts of a copolymer fraction of ethylene with propylene and/or another alpha-olefin, and optionally with minor amounts of a diene, said copolymer fraction containing less than 40% ethylene and/or other alpha-olefin, being soluble in xylene at room temperature, and having an intrinsic viscosity from 1.5 to 4 dl/g.

One suitable heterophasic propylene-ethylene copolymer is Basell ADFLEX® KS359. This polymer contains about 14% by weight ethylene and about 86% by weight propylene overall, has a melt flow rate (230° C.) of 12 grams/10 min., and includes three propylene-ethylene copolymer fractions as described above.

The additional random propylene-ethylene copolymer may include about 90-98% by weight propylene and about 2-10% by weight ethylene, desirably about 92-96% by weight propylene and about 4-8% by weight ethylene. One suitable random copolymer is Union Carbide 6D82, which has an ethylene content of about 5.5% by weight and a melt flow rate (230° C.) of 7 grams/10 min.

The polymer matrix 12 may include about 50-95 parts by weight of the heterophasic propylene-ethylene copolymer and about 5-50 parts by weight of the additional random copolymer, suitably about 60-90 parts by weight heterophasic propylene-ethylene copolymer and about 10-40 parts by weight of the additional random copolymer, desirably about 70-85 parts by weight heterophasic propylene-ethylene copolymer and about 15-30 parts by weight of the additional random copolymer.

If the skin layers 10 are very thin, they need not include filler particles in the matrix. Desirably, the skin layers 10 will include filler particles 14. Suitable filler particles 16 include any of the filler particles listed above for the core layer 30. Each skin layer 10 may include about 25-80% by weight polymer matrix and about 20-75% by weight filler particles, suitably about 30-60% by weight polymer matrix and about 40-70% by weight filler particles, desirably about 40-50% by weight polymer matrix and about 50-60% by weight filler particles. The voids 14 surrounding the filler particles 16 typically each have a dimension in at least one direction which is larger than the corresponding dimension of the enclosed filler particle(s), caused by stretching the film as described below.

The skin layers 10 need not include a fluorochemical. However, it is likely that some fluorochemical from the core layer 30 will migrate to the skin layers 10. To help preserve the oleophilic and bonding characteristics of the film 20, the skin layers 10 should contain less than 0.5% by weight fluorochemical, suitably less than 0.3% by weight fluorochemical, desirably less than 0.1% by weight fluorochemical. This way, both skin layers desirably will have oleophilic outer surfaces.

The core layer 30 of the breathable barrier film 20 should constitute about 50-98% of the total film mass, suitably about 70-94% of the total film mass, desirably about 80-90% of the total film mass. The skin layers 10 may each constitute about 1-25% of the total film mass (2-50% combined), suitably about 3-15% of the total film mass (6-30% combined), desirably about 5-10% of the total film mass (10-20% combined).

The film 20 is desirably prepared using a conventional cast coextrusion process. Once the cast film is prepared, it can be stretched to about 2-7 times its original length in at least one direction, desirably to about 3.5-4.5 times its original length in at least one direction, to cause voids to form around the filler particles in the core and skin layers. The voids are separated by thin polymer membranes, creating a tortuous path for permeability of water vapor but blocking the passage of aqueous and low surface tension liquids. The stretching may be performed in one direction, desirably the machine direction. The stretching may be performed using two or more pairs of nipped draw rollers, with each successive pair turning faster than the preceding pair. One or both draw rollers in each pair may be heated, so that the film experiences a stretching temperature of about 65-100° C. The stretched film may have a thickness of about 2-25 microns, suitably about 5-15 microns, desirably about 7-13 microns.

Figure 2:
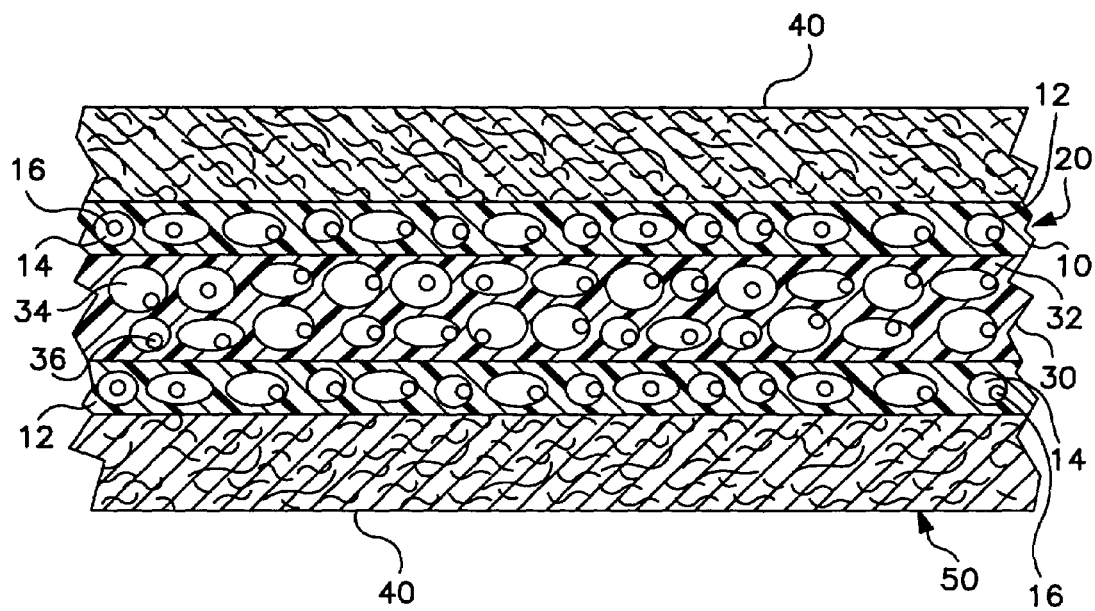
FIG. 2 is a cross-sectional view of a breathable viral barrier fabric laminate according to the invention.

As shown in FIG. 2, the breathable viral barrier film 20 is bonded on at least one side, preferably both sides, to a nonwoven web or webs 40 to form a breathable viral barrier laminate 50. Each nonwoven web 40 may be a spunbond web, a meltblown web, a bonded carded web, an air laid web, a foam, or a laminate or composite including one or more nonwoven webs. Either nonwoven web 40 may also be formed or modified using a hydraulic entangling process. The nonwoven webs 40 may be formed from a variety of thermoplastic polymers including without limitation polyolefins, polyamides, polyesters, and copolymers and combinations of these. Preferred polymers include polyolefins, such as polypropylene and/or polyethylene. Other suitable polymers include copolymers of mainly ethylene and $C_3$-$C_{12}$ alpha-olefins, having a density of 0.900-0.935 grams/cm$^3$, commonly known as linear low density polyethylenes. Also included are copolymers of at least 90% by weight propylene with not more than 10% by weight $C_2$ or $C_4$-$C_{12}$ alpha-olefins.

Each nonwoven layer 40 may have a basis weight of about 5-50 grams/m$^2$, suitably about 10-40 grams/m$^2$, desirably about 20-30 grams/m$^2$. In one suitable embodiment, the nonwoven layer 40 on one side of the film 20 is a spunbond web, and the nonwoven layer 40 on the other side of the film 20 is a spunbond-meltblown-spunbond ("SMS") laminate. The individual spunbond layer is formed from a polypropylene homopolymer or random propylene-ethylene copolymer including up to 10% by weight ethylene. The polypropylene homopolymer or copolymer may have a melt flow rate (230° C.) of about 2-50 grams/10 min. The spunbond and meltblown layers in the SMS laminate are also formed from a polypropylene homopolymer or random propylene-ethylene copolymer containing up to 10% by weight ethylene, and having a melt flow rate (230° C.) of about 2-50 grams/10 min. One example is when the nonwoven layers 40 and film 20 are laminated together by passing the layers between heated nip rollers, one of which has an embossing pattern, to thermally bond the layers at multiple points constituting about 12-18% of the interfacial area. Alternatively, the layers can be laminated using adhesive or ultrasonic bonding.

Figure 3:
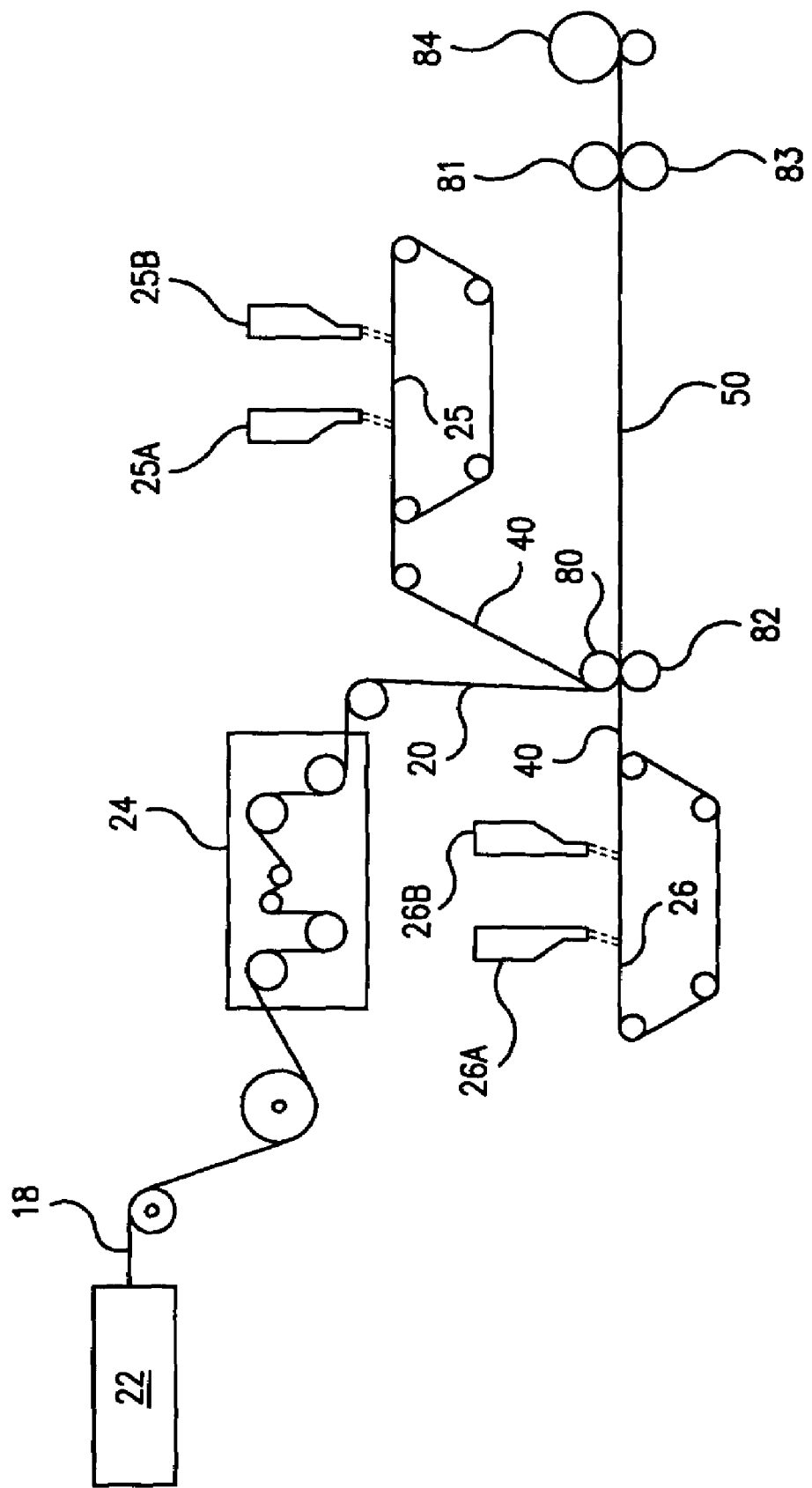
FIG. 3 is a schematic view of a process for making a breathable viral barrier fabric laminate according to the invention.

FIG. 3 illustrates a process for making a breathable, viral barrier laminate 50. Precursor multilayer film 18 is formed using a cast coextrusion process 22. The film is quenched, and is then heated and stretched in the machine direction using stretching apparatus 24 to form breathable microporous viral barrier film 20. First nonwoven web 40 may be separately formed, and is forwarded using conveyor apparatus 25 whereupon the nonwoven web may be treated with antistat, surfactants and/or other ingredients using dispensers 25A and 25B. Second nonwoven web 40 may be separately formed, and is forwarded using conveyor apparatus 26 whereupon it may be treated with antistats, surfactants and/or other ingredients using dispensers 26A and 26B. The nonwoven webs 40 and film 20 are joined, with the film sandwiched between the two nonwoven webs, using a calender nip assembly including first and second nip rollers 80 and 82.

As shown in FIG. 3, bonding roll 80 can be a pattern roll, whereas second bonding roll 82 is a smooth (anvil) roll.

Both rolls are driven by conventional means, such as, for example, electric motors (not shown). Pattern roll 80 is a right circular cylinder that may be formed of any suitable, durable material, such as, for example, steel, to reduce wear on the rolls during use. Pattern roll 80 has on its outermost surface a pattern of raised bonding areas. An intermittent pattern of discrete, regularly repeating bonding points can be suitably employed, for example, as is conventional in the art. The bonding areas on pattern roll 80 form a nip with the smooth or flat outer surface of opposed positioned anvil roll 82; which also is a right circular cylinder that can be formed of any suitable, durable material, such as, for example, steel, hardened rubber, resin-treated cotton or polyurethane.

The pattern of raised bonding areas on the pattern roll 80 is selected such that the area of at least one surface of the resulting barrier material 50 occupied by bonds after passage through the nip formed between pattern rolls 80, 82 ranges from about 10 percent to about 30 percent of the surface area of the barrier material. The bonding area of the barrier material 50 can be varied to achieve the above-mentioned percent bond area, as is known in the art.

The temperature of the outer surface of the pattern roll 80 can be varied by heating or cooling relative to the smooth roll 82. Heating and/or cooling can affect, for example, the degree of lamination of the individual layers forming the barrier material 50. Heating and/or cooling of pattern roll 80 and/or smooth roll 82 can be effected by conventional means (not shown) well known in the art. The specific ranges of temperatures to be employed in forming the barrier material 50 are dependent on a number of factors, including the types of polymeric materials employed in forming the individual layers of the barrier material 50, the dwell time of the individual layers within the nip and the nip pressure between the pattern roll 80 and anvil roll 82. After barrier material 50 exits the nip formed between the bonding rolls 80, 82, the material 50 can be further compressed and guided using nip rollers 81 and 83, and wound onto roll 84 for subsequent processing.

Modifications in the above-described process will be readily apparent to those of ordinary skill in the art without departing from the spirit and scope of the present invention. For example, after the barrier material 50 is formed, it can continue in-line for further processing and converting. Different apparatus can be used for stretch-thinning the film 20. Other known means for bonding and laminating the film 20 to nonwoven layers 40 may be used, provided the resulting barrier material 50 has the required properties described herein. Finally, formation of the film 20 and/or nonwoven layers 40 can take place at a remote location, with rolls of the individual layers unwound and fed to the nip formed between pattern roll 80 and smooth roll 82. Also, for certain applications, it is advantageous to have a two component material which can be formed as above described by omitting one of the nonwoven webs, for example. Also, nonwoven layers 40 may either be thermally or adhesively laminated to the stretch-thinned film to form the composite.

The breathable viral barrier film 20 and/or laminate 50 may be used in a wide variety of surgical articles to provide improved viral barrier properties, especially when exposed to low surface tension liquids. Surgical articles include surgical gowns, drapes, face masks, scrubs, sterile wrap, sterilization peel pouches, fenestration materials, and the like. The breathable viral barrier film and/or laminate may also be used as personal protective clothing in applications such as workwear, laboratory applications, clean room applications such as semiconductor manufacturing, agriculture applications, mining applications, environmental applications, veterinary applications and the like.

TEST PROCEDURES

Water Vapor Transmission Rate (WVTR)

A suitable technique for determining the WVTR (water vapor transmission rate) value of a film or laminate material of the invention is the test procedure standardized by INDA (Association of the Nonwoven Fabrics Industry), number IST-70.4-99, entitled "STANDARD TEST METHOD FOR WATER VAPOR TRANSMISSION RATE THROUGH NONWOVEN AND PLASTIC FILM USING A GUARD FILM AND VAPOR PRESSURE SENSOR" which is incorporated by reference herein. The INDA procedure provides for the determination of WVTR, the permeance of the film to water vapor and, for homogeneous materials, water vapor permeability coefficient.

The INDA test method is well known and will not be set forth in detail herein. However, the test procedure is summarized as follows. A dry chamber is separated from a wet chamber of known temperature and humidity by a permanent guard film and the sample material to be tested. The purpose of the guard film is to define a definite air gap and to quiet or still the air in the air gap while the air gap is characterized. The dry chamber, guard film, and the wet chamber make up a diffusion cell in which the test film is sealed. The sample holder is known as the Permatran-W Model 100K manufactured by Mocon/Modern Controls, Inc., Minneapolis, Minn. A first test is made of the WVTR of the guard film and the air gap between an evaporator assembly that generates 100% relative humidity.

Water vapor diffuses through the air gap and the guard film and then mixes with a dry gas flow which is proportional to water vapor concentration. The electrical signal is routed to a computer for processing. The computer calculates the transmission rate of the air gap and the guard film and stores the value for further use.

The transmission rate of the guard film and air gap is stored in the computer as CalC. The sample material is then sealed in the test cell. Again, water vapor diffuses through the air gap to the guard film and the test material and then mixes with a dry gas flow that sweeps the test material. Also, again, this mixture is carried to the vapor sensor. The computer then calculates the transmission rate of the combination of the air gap, the guard film, and the test material. This information is then used to calculate the transmission rate at which moisture is transmitted through the test material according to the equation:

$$TR^{-1}_{test\ material} = TR^{-1}_{test\ material,\ guardfilm,\ airgap} - TR^{-1}_{guardfilm,\ airgap}$$

Calculations:

WVTR: The calculation of the WVTR uses the formula:

$$WVTR = F\rho_{sat}(T)RH/Ap_{sat}(T)(1-RH)$$

where:

F=The flow of water vapor in cc/min., $\rho_{sat}(T)$=The density of water in saturated air at temperature T, RH=The relative humidity at specified locations in the cell, A=The cross sectional area of the cell, and, $p_{sat}(T)$=The saturation vapor pressure of water vapor at temperature T.

Hydrohead Resistance

The hydrohead resistance is a measure of liquid pressure resistance, which is the ability of a film or laminate to withstand application of a load of liquid without fracturing, bursting or tearing. The liquid pressure resistance of a film or laminate depends on its thickness, material composition, how it is made and processed, the surrounding environment and method of testing. Hydrohead values are measured generally according to the Hydrostatic Pressure Test described in Method 5514 of Federal Test Methods Standard No. 191A, which is equivalent to AATCC Test Method 127-89 and INDA Test Method 80.4-92, and which is incorporated herein by reference. The following additional parameters are pertinent to this invention.

The repellency or barrier ("strikethrough resistance") properties of a film or laminate of the invention are measured using hydrostatic head tests with a low surface tension liquid (about 26.4 dynes/cm). A suitable low surface tension liquid is an aqueous solution of SYNTHRAPOL® KB available from ICI Americas in Wilmington, Del., diluted to about 0.1%. The hydrohead method utilizes a TEXTEST FX3000 Hydrostatic Head Tester under dynamic and static conditions. Under the dynamic conditions, the specimens are subjected to a steadily increasing pressure of the low surface tension liquid. The rate of increase is 60 mbar/minute and the maximum pressure tested is 300 mbar (4 psi). The "strikethrough resistance" is expressed as the pressure, or the time elapsed at 300 mbar, when the liquid penetrates the sample. The test is completed after three areas have failed. The "static" conditions involve subjecting the sample to the low surface tension liquid at a constant pressure of 19 mbar. The "strikethrough resistance" is expressed as the time elapsed when the liquid penetrates the sample. The test is completed after three areas have failed.

Oil Droplet Test

The oil droplet test is useful to determine whether a film is oleophilic or oleophobic. The film sample is laid out on a table, and three or more drops of mineral oil are added to the film surface at spaced apart locations. One suitable mineral oil is sold by Eckerd Corporation under the name "mineral oil." This test corresponds to American Association Of Textile Chemists And Colorists (AATCC) Standard Test 118-1983, which is incorporated by reference. In regard to the standard test, mineral oil has a repellency rating number of one, indicating relatively easy penetration tendency compared to most other oils.

If the film is oleophobic, the oil droplets will not wet the surface, and will remain as bead-shaped droplets having contact angles of generally greater than 90 degree with the film surface. If the film is oleophilic, the oil droplets will spread out and wet the surface. The contact angles between the oil and film surface will be generally less than 90 degrees after about 30 seconds of contact. If the film is oleophilic and microporous, some of the oil will penetrate the film and migrate to the other side.

EXAMPLES

Film samples having a core layer and two outer skin layers were produced on a cast coextrusion line. The core layer of each film contained DOWLEX® 2244A LLDPE from Dow Chemical Co., Exxon-Mobil 2MO65 single-site catalyzed ethylene-alpha olefin plastomer from Exxon-Mobil Chemical Co., FILMLINK™ 2029, calcium carbonate from Imerys Co. of Roswell, Ga., and a concentrate of fluorochemical from E.I. DuPont deNemours & Co. compounded into DOWLEX® 2244A and referred to as TLF9536, in the following weight percentages. Antioxidants, heat stabilizers, coolants and other additives, such as are supplied by Ciba Specialty Chemicals, Inc., can also be added.

| Core Layer Compositions, % By Weight | | | | | |
|---|---|---|---|---|---|
| Sample | LLDPE | Plastomer | CaCO$_3$ | Fluorochemical | Additives (Stabilizers, etc.) |
| A (control) | 28.4 | 15.1 | 55.0 | 0.0 | 1.5 |
| B | 27.6 | 10.0 | 59.0 | 2.0 | 1.4 |
| C | 33.0 | 9.0 | 52.0 | 4.0 | 2.0 |

For each film, the core layer constituted 85% of the film mass. The skin layers each constituted 7.5% of the total film mass, and had an identical composition for all three films. Each skin layer contained 34% by weight Basell ADFLEX® KS359, which is a heterophasic propylene-ethylene copolymer combination containing 86% by weight propylene and 14% by weight ethylene. Each skin layer also contained 8% by weight Union Carbide 6D82 random propylene-ethylene copolymer (94.5% by weight propylene, 5.5% by weight ethylene), 57% by weight FILMLINK 2029 calcium carbonate, and 1% by weight additives.

Figure 4:
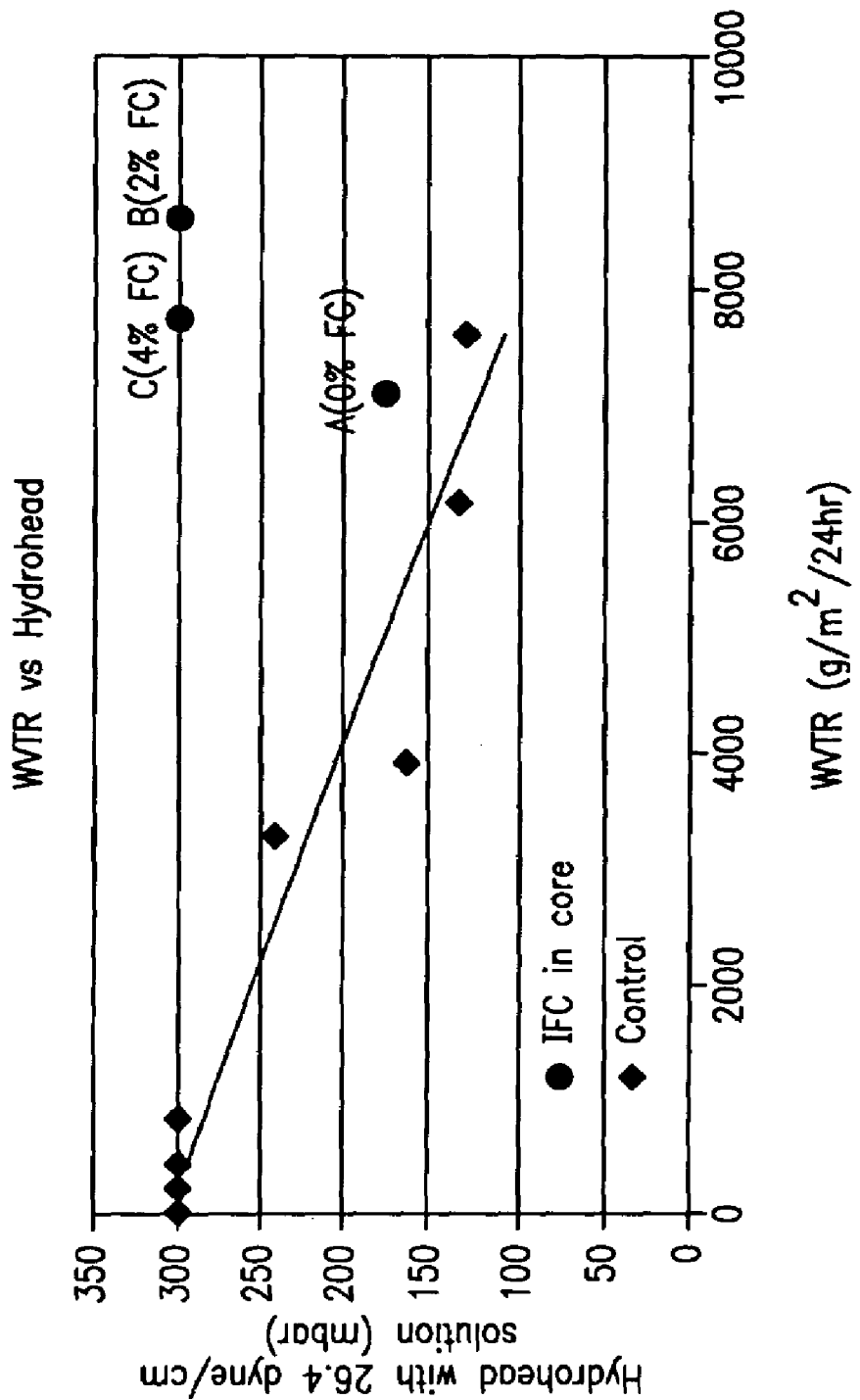
FIG. 4 is a plot of moisture vapor transmission rate versus hydrohead values using a low surface tension liquid, for various film samples.

FIG. 4 illustrates the WVTR vs. hydrohead using an aqueous solution of SYNTHRAPOL® KB (about 26.4 dyne/cm surface tension) for various breathable film samples. The straight line defined by the rectangular points illustrates a general relationship between WVTR and hydrohead for generally similar film samples with different levels of calcium carbonate and other ingredients. Sample A, the control with 0% fluorochemical, exhibited a hydrohead resistance slightly above the line. Samples B and C, having 2% and 4% fluorochemical in their respective core layers, exhibited hydrohead resistances substantially above the line, and more than 50% higher than the control. These data illustrate that the use of the selected fluorochemical in the core layer of the three-layer breathable film provides substantially increased resistance to penetration by low surface tension liquids. The inventive films, and fabric laminates containing them, should thus exhibit improved resistance to penetration by viruses in hospital environments where low surface tension liquids are employed.

While the embodiments of the invention disclosed herein are presently considered preferred, various modifications and improvements can be made without departing from the spirit and scope of the invention. The scope of the invention is indicated by the appended claims, and all changes that fall within the meaning and range of equivalents are intended to be embraced therein.

We claim:

1. A breathable thermoplastic film, comprising:
   a core layer including a thermoplastic polymer matrix, filler particles, and at least 0.5% by weight of a telomerized fluorochemical; and
   skin layers on both sides of the core layer, each skin layer including a thermoplastic polymer matrix and zero to less than 0.5% by weight of the telomerized fluorochemical;
   wherein the film is oleophilic and passes the federal performance standards set forth in ASTM F1670 and ASTM F1671.

2. The breathable thermoplastic film of claim 1, wherein the core layer comprises 0.5% to about 5.0% by weight of the telomerized fluorochemical.

3. The breathable thermoplastic film of claim 1, wherein the core layer comprises about 1.0-4.0% by weight of the telomerized fluorochemical.

4. The breathable thermoplastic film of claim 1, wherein the core layer comprises about 2.0-3.0% by weight of the telomerized fluorochemical.

5. The breathable thermoplastic film of claim 1, wherein each skin layer comprises less than about 0.3% by weight of the telomerized fluorochemical.

6. The breathable thermoplastic film of claim 1, wherein each skin layer comprises less than about 0.1% by weight of the telomerized fluorochemical.

7. The breathable thermoplastic film of claim 1, wherein the thermoplastic polymer matrix in the core layer comprises a polymer selected from olefin polymers, polyurethanes, copolyether esters, polyamide polyether block copolymers, ethylene methyl acrylate, ethylene ethyl acrylate, ethylene vinyl acetate and combinations thereof.

8. The breathable thermoplastic film of claim 1, wherein the thermoplastic polymer matrix in the core layer comprises an olefin polymer.

9. The breathable thermoplastic film of claim 1, wherein the thermoplastic polymer matrix in the core layer comprises a linear low density polyethylene and a single-site catalyzed ethylene-alpha olefin copolymer plastomer.

10. The breathable thermoplastic film of claim 1, wherein the core layer comprises about 25-80% by weight of the thermoplastic polymer matrix and about 20-75% by weight of the filler particles.

11. The breathable thermoplastic film of claim 1, wherein the core layer comprises about 30-60% by weight of the thermoplastic polymer matrix and about 40-70% by weight of the filler particles.

12. The breathable thermoplastic film of claim 1, wherein the core layer comprises about 40-50% by weight of the thermoplastic polymer matrix and about 50-60% by weight of the filler particles.

13. The breathable thermoplastic film of claim 1, wherein the thermoplastic polymer matrix in the skin layers comprises a polymer selected from heterophasic propylene-ethylene copolymers, propylene-ethylene random copolymers, ethylene vinyl acetate, ethylene methyl acrylate, amorphous ethylene alpha-olefin copolymers, having densities of about 0.89 grams/cm$^3$ or less, APAO polymers, and combinations thereof.

14. The breathable thermoplastic film of claim 1, wherein the thermoplastic polymer matrix in the skin layers comprises a heterophasic propylene-ethylene copolymer and a propylene-ethylene random copolymer.

15. The breathable thermoplastic film of claim 1, wherein the skin layers further comprise filler particles.

16. The breathable thermoplastic film of claim 15, wherein the skin layers comprise about 25-80% by weight of the thermoplastic polymer matrix and about 20-75% by weight of the filler particles.

17. The breathable thermoplastic film of claim 15, wherein the skin layers comprise about 30-60% by weight of the thermoplastic polymer matrix and about 40-70% by weight of the filler particles.

18. The breathable thermoplastic film of claim 15, wherein the skin layers comprise about 40-50% by weight of the thermoplastic polymer matrix and about 50-60% by weight of the filler particles.

19. A breathable thermoplastic film, comprising:
a core layer including a thermoplastic polymer matrix, filler particles and at least 0.5% by weight of a fluorochemical; and
skin layers on both sides of the core layer, each skin layer including a thermoplastic polymer matrix;
wherein the film is oleophilic and passes the federal performance standards set forth in ASTM F1670 and ASTM F1671.

20. The breathable thermoplastic film of claim 19, wherein the core layer comprises 0.5% to about 5.0% by weight of the fluorochemical.

21. The breathable thermoplastic film of claim 19, wherein the core layer comprises about 1.0-4.0% by weight of the fluorochemical.

22. The breathable thermoplastic film of claim 19, wherein the core layer comprises about 2.0-3.0% by weight of the fluorochemical.

23. The breathable thermoplastic film of claim 19, wherein each skin layer comprises less than about 0.3% by weight of the fluorochemical.

24. The breathable thermoplastic film of claim 19, wherein each skin layer comprises less than about 0.1% by weight of the fluorochemical.

25. The breathable thermoplastic film of claim 19, wherein the thermoplastic polymer matrix in the core layer comprises a polymer selected from olefin polymers, polyurethanes, copolyether esters, polyamide polyether block copolymers, ethylene methyl acrylate, ethylene ethyl acrylate, ethylene vinyl acetate and combinations thereof.

26. The breathable thermoplastic film of claim 19, wherein the thermoplastic polymer matrix in the core layer comprises an olefin polymer.

27. The breathable thermoplastic film of claim 19, wherein the thermoplastic polymer matrix in the core layer comprises a linear low density polyethylene and a single-site catalyzed ethylene-alpha olefin copolymer plastomer.

28. The breathable thermoplastic film of claim 19, wherein the core layer comprises about 25-80% by weight of the thermoplastic polymer matrix and about 20-75% by weight of the filler particles.

29. The breathable thermoplastic film of claim 19, wherein the core layer comprises about 30-60% by weight of the thermoplastic polymer matrix and about 40-70% by weight of the filler particles.

30. The breathable thermoplastic film of claim 19, wherein the core layer comprises about 40-50% by weight of the thermoplastic polymer matrix and about 50-60% by weight of the filler particles.

31. The breathable thermoplastic film of claim 19, wherein the thermoplastic polymer matrix in the skin layers comprises a polymer selected from heterophasic propylene-ethylene copolymers, propylene-ethylene random copolymers, ethylene vinyl acetate, ethylene methyl acrylate, amorphous ethylene alpha-olefin copolymers having densities of about 0.89 grams/cm$^3$ or less, APAO polymers, and combinations thereof.

32. The breathable thermoplastic film of claim 19, wherein the thermoplastic polymer matrix in the skin layers comprises a heterophasic propylene-ethylene copolymer and a propylene-ethylene random copolymer.

33. The breathable thermoplastic film of claim 19, wherein the skin layers further comprise filler particles.

34. The breathable thermoplastic film of claim 33, wherein the skin layers comprise about 25-80% by weight of the thermoplastic polymer matrix and about 20-75% by weight of the filler particles.

35. The breathable thermoplastic film of claim 33, wherein the skin layers comprise about 30-60% by weight of the thermoplastic polymer matrix and about 40-70% by weight of the filler particles.

36. The breathable thermoplastic film of claim 33, wherein the skin layers comprise about 40-50% by weight of the thermoplastic polymer matrix and about 50-60% by weight of the filler particles.

37. A breathable, laminate, comprising:
a breathable thermoplastic film including a core layer and skin layers on both sides of the core layer;
a first nonwoven layer joined to one of the skin layers; and
a second nonwoven layer joined to the other of the skin layers;
the core layer including a thermoplastic polymer matrix, filler particles and at least about 0.5% by weight of a fluorochemical;
each skin layer including a thermoplastic polymer matrix;
wherein the film is oleophilic and the laminate passes the federal performance standards set forth in ASTM F1670 and ASTM F1671.

38. The breathable, viral barrier laminate of claim 37, wherein each nonwoven layer comprises a material selected from a spunbond web, a meltblown web, a bonded carded web, an air laid web, and a laminate or composite including one or more nonwoven webs.

39. The breathable, viral barrier laminate of claim 37, wherein each nonwoven layer comprises a spunbond web.

40. The breathable, viral barrier laminate of claim 37, wherein the first nonwoven layer comprises a spunbond web and the second nonwoven layer comprises a spunbond-meltblown-spunbond laminate.

41. A surgical article comprising the breathable, viral barrier laminate of claim 37.

42. A surgical gown comprising the breathable, viral barrier laminate of claim 37.

43. A surgical drape comprising the breathable, viral barrier laminate of claim 37.

44. A surgical face mask comprising the breathable, viral barrier laminate of claim 37.

45. A surgical scrub comprising the breathable, viral barrier laminate of claim 37.

46. A sterile wrap comprising the breathable, viral barrier laminate of claim 37.

47. A sterilization peel pouch comprising the breathable, viral barrier laminate of claim 37.

48. A personal protective article comprising the breathable, viral barrier laminate of claim 37.

49. A fenestration material comprising the breathable, viral barrier laminate of claim 37.

* * * * *